(12) United States Patent
Liu

(10) Patent No.: US 8,899,549 B2
(45) Date of Patent: Dec. 2, 2014

(54) DRAIN VALVE BASE

(76) Inventor: Yongmao Liu, Xiamen (CN)

( * ) Notice: Subject to any disclaimer, the term of this patent is extended or adjusted under 35 U.S.C. 154(b) by 314 days.

(21) Appl. No.: 13/639,010

(22) PCT Filed: Oct. 27, 2010

(86) PCT No.: PCT/CN2010/078149
§ 371 (c)(1),
(2), (4) Date: Oct. 2, 2012

(87) PCT Pub. No.: WO2011/097899
PCT Pub. Date: Aug. 18, 2011

(65) Prior Publication Data
US 2013/0207017 A1   Aug. 15, 2013

(30) Foreign Application Priority Data

Feb. 9, 2010   (CN) .................. 2010 2 0115175 U

(51) Int. Cl.
*F16K 47/00*   (2006.01)
*F16L 55/02*   (2006.01)
*E03D 1/34*   (2006.01)
*E03C 1/23*   (2006.01)
*F16K 51/00*   (2006.01)
*E03D 1/012*   (2006.01)
*E03D 1/30*   (2006.01)

(52) U.S. Cl.
CPC ............... *F16K 51/00* (2013.01); *E03D 1/012* (2013.01); *E03D 1/30* (2013.01)

USPC .................... 251/127; 4/378; 4/688

(58) Field of Classification Search
CPC .............. F16K 47/08; F16K 1/42; E03D 1/34
USPC .............. 251/118, 127; 4/679, 688, 290, 368, 4/378; 137/625.33, 625.37
See application file for complete search history.

(56) References Cited

U.S. PATENT DOCUMENTS

| | | | | |
|---|---|---|---|---|
| 2,364,058 A * | 12/1944 | Burk et al. | ................ | 137/561 A |
| 5,176,168 A * | 1/1993 | Stoll et al. | .................. | 137/454.5 |
| 5,349,981 A * | 9/1994 | Schmucki et al. | ............ | 137/430 |
| 5,653,252 A * | 8/1997 | Steg et al. | ................ | 137/315.08 |
| 8,375,974 B2 * | 2/2013 | Yan | ................ | 137/100 |
| 2009/0255043 A1 * | 10/2009 | Halloran et al. | .................. | 4/378 |

* cited by examiner

*Primary Examiner* — Elizabeth Houston
*Assistant Examiner* — Michael R Reid

(57) ABSTRACT

A drain valve base includes an upper connection seat and a lower connection seat which are integrally formed. The upper connection seat is connected with the lower connection seat by connection arms which are provided at intervals, and hollow portions are provided between every two connection arms. A through drain outlet is formed in the center portion of the lower connection seat, and an annular surface is formed on the top of the lower connection seat. A water-seal convex ring is formed on a side part of the annular surface which is adjacent to the inwall of the drain outlet. A water-seal surface is formed on the top of the water-seal convex ring, and blocking devices which can stop water flow are provided on the inner side and the outer side of the water-seal convex ring.

2 Claims, 7 Drawing Sheets

DRAIN VALVE BASE

BACKGROUND OF THE INVENTION

1. Field of the Invention

The present invention relates to a toilet, and more particularly, to a drain valve base of a flush toilet.

2. Description of the Prior Art

A conventional drain valve of a water tank of a flush toilet comprises a valve plug, a driving assembly of a driving valve plug and a drain valve base. The drain valve base is a hollow configuration. As shown in FIG. 1 to FIG. 3, the drain valve base comprises an upper connection seat (10) and a lower connection seat (20) which are integrally formed. The upper connection seat (10) is connected with the lower connection seat (20) by connection arms (101) which are provided at intervals, and hollow portions (102) are formed between every two connection arms (101). The lower connection seat (20) has an annular surface (201) on a top end thereof. A through drain outlet (202) is formed in the center portion of the lower connection seat (20). The bottom of the lower connection seat (20) is connected to the drain hole at the bottom of the water tank. When the drain valve is closed, the valve plug of the drain valve is against a water-seal surface (201) to block water from flowing through a drain outlet (202). When the drain valve is opened, a driving member drives the valve plug to disengage from the water-seal surface (201). The water flows through the hollow portions (102) of the upper connection seat (10) to the drain outlet (202) to be discharged out of the water tank. The water flow generates a parabola path. Because the drain outlet (202) below the annular water-seal surface (201) is in a cylindrical shape, there is litter water at the inner wall of the drain outlet. The cross-sectional of the water flow is limited to the central portion of the drain outlet (202), so the drain speed of the water is low.

The drain speed of the water direct influences the function of the flush toilet. If the drain speed is low, the toilet cannot be flushed clean. Sometimes, it is necessary to flush the toilet many times, which wastes water.

Accordingly, the inventor of the present invention has devoted himself based on his many years of practical experiences to solve these problems.

SUMMARY OF THE INVENTION

The primary object of the present invention is to provide a drain valve base to overcome the problems of the conventional toilet which cannot be flushed clean and needs more water to flush.

In order to achieve the aforesaid object, the drain valve base of the present invention comprises an upper connection seat and a lower connection seat which are integrally formed. The upper connection seat is connected with the lower connection seat by connection arms which are provided at intervals, and hollow portions are formed between every two connection arms. The lower connection seat has an annular surface on a top end thereof. A through drain outlet is formed in the center portion of the lower connection seat. One side of the annular surface is formed with a water-seal convex ring located close to the drain outlet. The water-seal convex ring has a water-seal surface on a top end thereof. Blocking devices which can stop water flow are provided on the inner side and the outer side of the water-seal convex ring.

Preferably, the blocking devices comprise an annular stop wall disposed on the annular surface at the outer side of the water-sealing convex ring.

Preferably, the blocking devices comprise a plurality of guiding cylindrical posts disposed at the outer side or the inner side of the water-seal convex ring.

Preferably, the blocking devices comprise an annular stop wall disposed on the annular surface at the outer side of the water-sealing convex ring. The stop wall is integrally connected with the connection arms. A plurality of guiding cylindrical posts is provided between the stop wall and the water-seal convex ring and at inner side of the water-seal convex ring. The guiding cylindrical posts at the outer side of the water-seal convex ring have a height greater than that of the stop wall. The guiding cylindrical posts at the inner side of the water-seal convex ring have a height less than that of water-seal convex ring.

Preferably, the blocking devices comprise an annular stop wall disposed on the annular surface at the outer side of the water-sealing convex ring. The stop wall is integrally connected with the connection arms. The inner side of the water-seal convex ring is provided with a plurality of guiding cylindrical posts. The guiding cylindrical posts at the inner side of the water-seal convex ring have a height less than that of the water-seal convex ring.

Preferably, the blocking devices comprise an annular toothed wall disposed on the annular surface at an outer side of the water-sealing convex ring.

Preferably, the lower connection seat has a top inner wall which is inclined outward for the water to flow smoothly.

When the water flows to the hollow portions, the water will generate a first parabola which is blocked by the blocking device at the inner side of water-seal convex ring to shorten the distance of the parabola, such that the water is filled with the entire drain outlet. Therefore, the cross-section area of the water flow increase and the volume of the water increases to accelerate the drain speed so as to clean the toilet quickly and to save water.

DETAILED DESCRIPTION OF THE PREFERRED EMBODIMENTS

Figure 1:
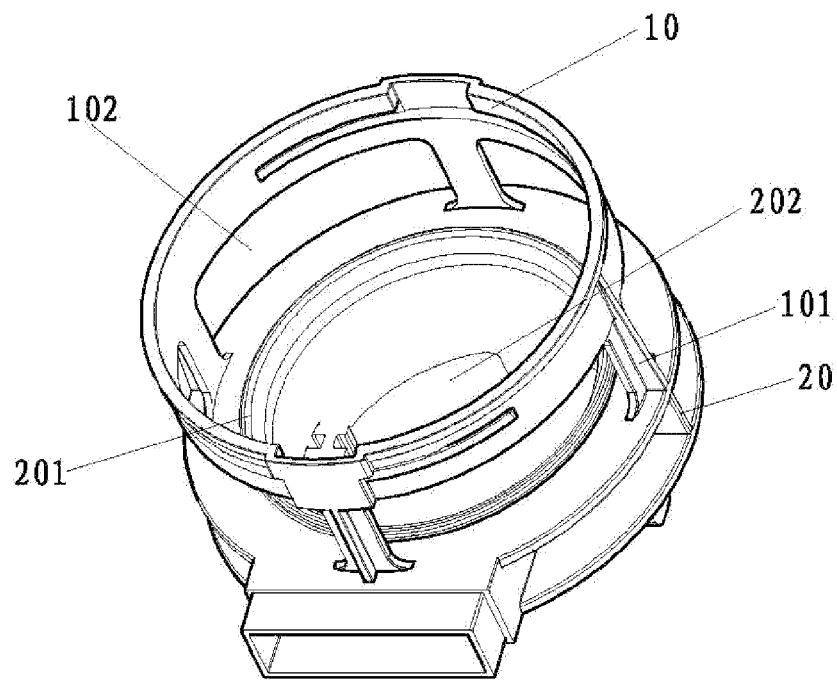
FIG. 1 is a perspective view of a conventional drain valve base.
Figure 2:
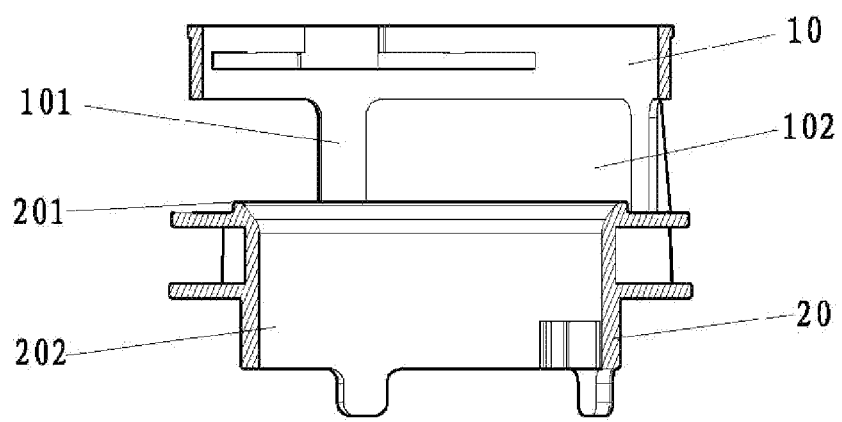
FIG. 2 is a cross-sectional view of the conventional drain valve base.
Figure 3:
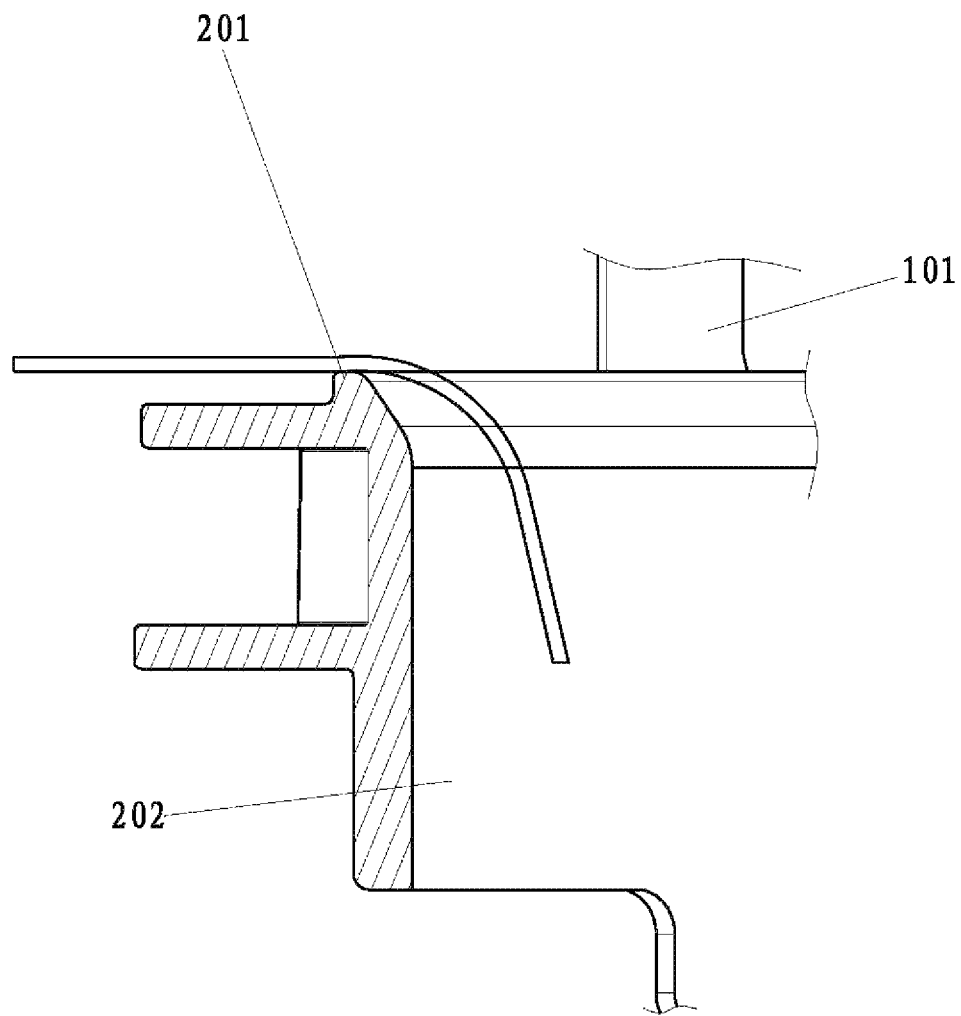
FIG. 3 is a partially enlarged view of FIG. 2.
Figure 4:
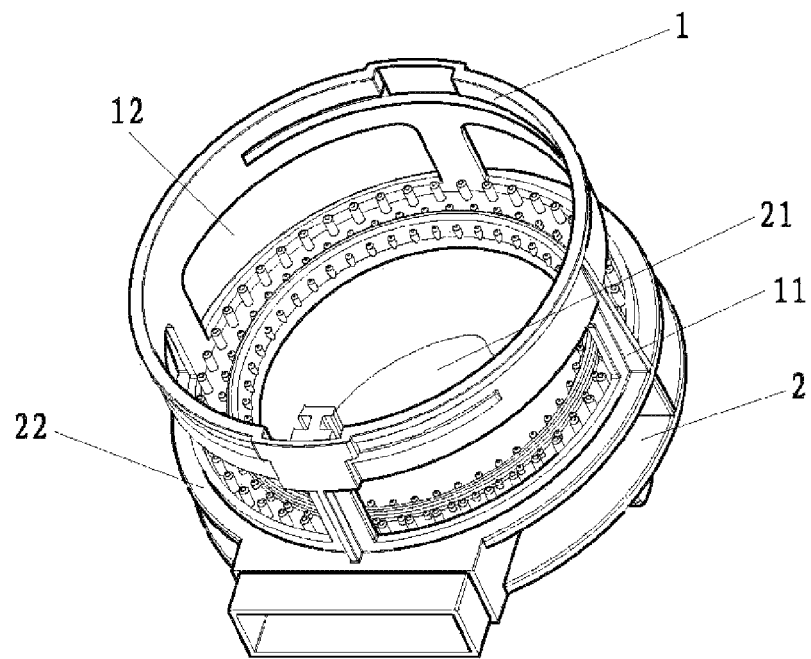
FIG. 4 is a perspective view according to a first embodiment of the present invention.
Figure 5:
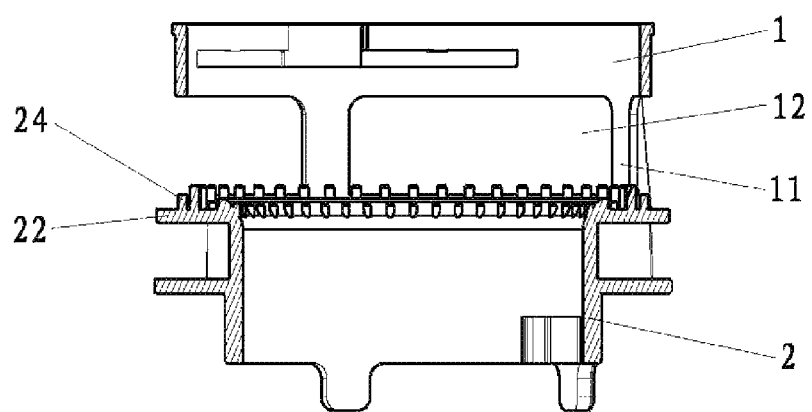
FIG. 5 is a cross-sectional view according to the first embodiment of the present invention.

Embodiments of the present invention will now be described, by way of example only, with reference to the accompanying drawings.

As shown in FIG. 3 to FIG. 6, the drain valve base of the present invention comprises an upper connection seat (1) and a lower connection seat (2) which are integrally formed. The upper connection seat (1) is connected with the lower connection seat (2) by connection arms (11) which are provided at intervals, and hollow portions (12) are formed between every two connection arms (11). The lower connection seat (2) has an annular surface (22) on a top end thereof. A through drain outlet (21) is formed in the center portion of the lower connection seat (2). One side of the annular surface (22) is formed with a water-seal convex ring (23) located close to the drain outlet (21). The water-seal convex ring (23) has a water-seal surface (231) on a top end thereof. Blocking devices which can stop water flow are provided at the inner side and the outer side of the water-seal convex ring (23). The lower connection seat (2) has a top inner wall (26) which is inclined outward for the water to flow smoothly.

In a first embodiment of the present invention, the blocking devices comprise an annular stop wall (24) disposed on the annular surface (22) at the outer side of the water-sealing convex ring (23). The stop wall (24) is integrally connected with the connection arms (11). A plurality of guiding cylindrical posts (251) is provided between the stop wall (24) and the water-seal convex ring (23). The inner side of the water-seal convex ring (23) is provided with a plurality of guiding cylindrical posts (252). The guiding cylindrical posts (251) at the outer side of the water-seal convex ring (23) have a height greater than that of the stop wall (24). The guiding cylindrical posts (252) at the inner side of the water-seal convex ring (23) have a height less than that of the water-seal convex ring (23).

Figure 6:
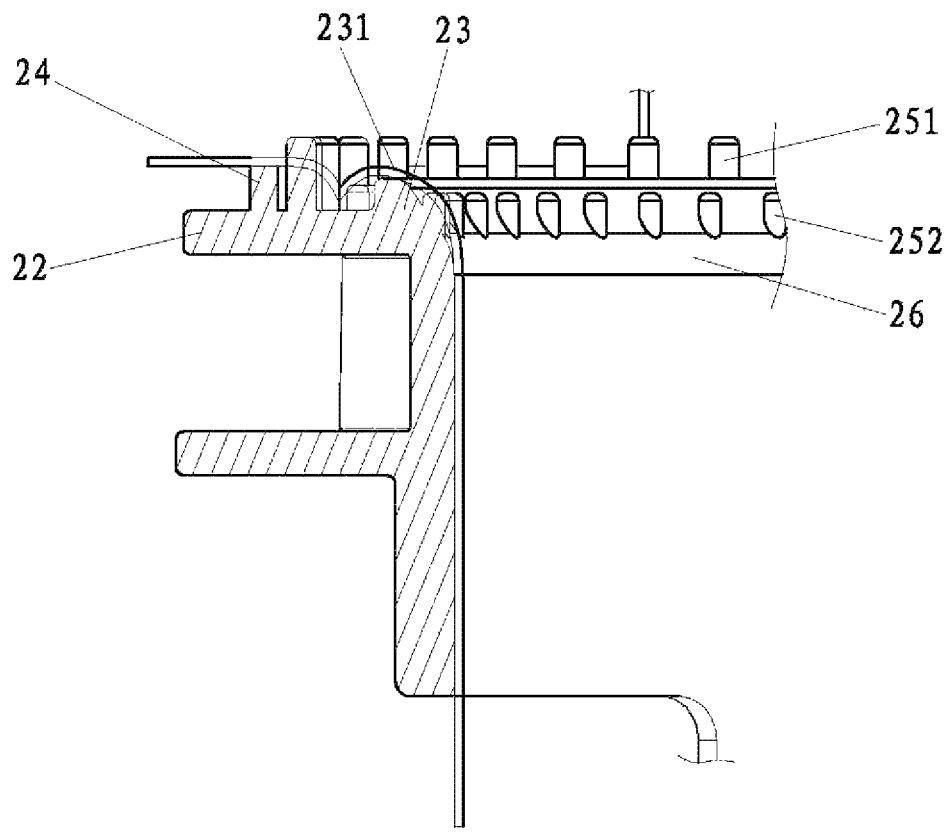
FIG. 6 is a partially enlarged view of FIG. 5.

Referring to FIG. 6, when the water flows to the hollow portions (12), the water passing the stop wall (24) will generate a first parabola path which is blocked by the guiding cylindrical posts (251) to shorten the distance of the original parabola. Thus, the water passing the water-seal surface (231) slows down to generate a second parabola. The distance of the second parabola is shorter. The second parabola is stopped by the guiding cylindrical posts (252) to shorten its distance, such that the water is filled with the entire drain outlet (21). Therefore, the cross-section area of the water flow increases and the volume of the water increases to accelerate the drain speed.

Figure 7:
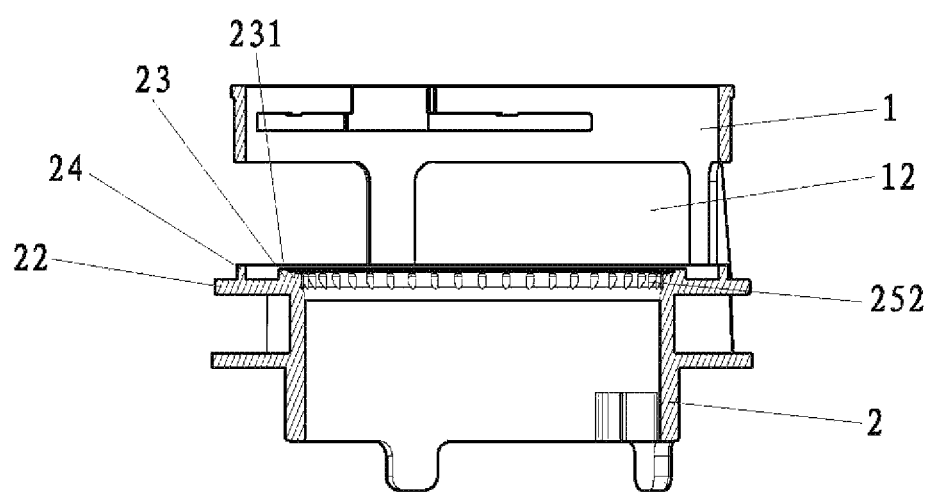
FIG. 7 is a cross-sectional view according to a second embodiment of the present invention.

FIG. 7 shows a second embodiment of the present invention, which is substantially similar to the first embodiment with the exceptions described hereinafter. The blocking devices in this embodiment comprise an annular stop wall (24) disposed on the annular surface (22) at the outer side of the water-sealing convex ring (23). The stop wall (24) is integrally connected with the connection arms (11). The inner side of the water-seal convex ring (23) is provided with a plurality of guiding cylindrical posts (252). The guiding cylindrical posts (252) at the inner side of the water-seal convex ring (23) have a height less than that of the water-seal convex ring (23). In order to achieve the same diversion effect as the first embodiment, the distance between the stop wall (24) and the water-seal convex ring (23) in this embodiment is greater than the distance between the stop wall (24) and the water-seal convex ring (23) in the first embodiment. When the water flows to the hollow portions (12), the water passing the stop wall (24) will generate a first parabola. The distance between the stop wall (24) and the water-seal convex ring (23) made the height of the water-seal convex ring (23) higher than the height of the first parabola passing the water-seal convex ring (23). This effect can be achieved by adjusting the height of the water-seal convex ring (23) relative to the stop wall (24). The water passing the stop wall (24) is direct blocked by the water-seal convex ring (23) to shorten the distance of the parabola. The water passing water-seal convex ring (23) generates a second parabola. The second parabola is stopped by the guiding cylindrical posts (252) to shorten the distance of the parabola again, such that the water is filled with the entire drain outlet (21). Therefore, the cross-section area of the water flow increases and the volume of the water increases to accelerate the drain speed.

Figure 8:
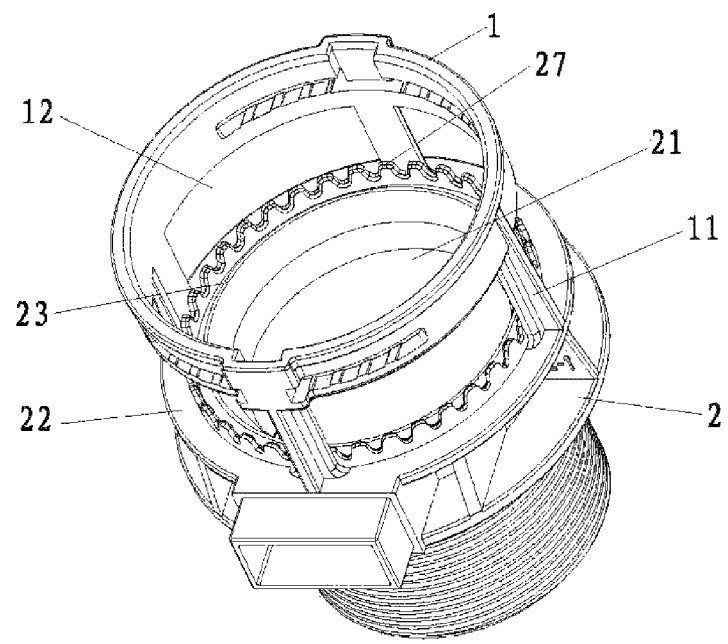
FIG. 8 is a perspective view according to a third embodiment of the present invention.
Figure 9:
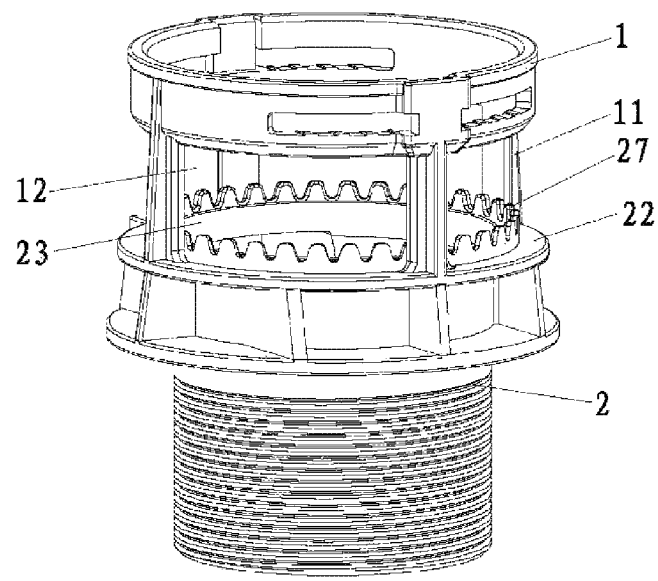
FIG. 9 is another perspective view according to the third embodiment of the present invention.
Figure 10:
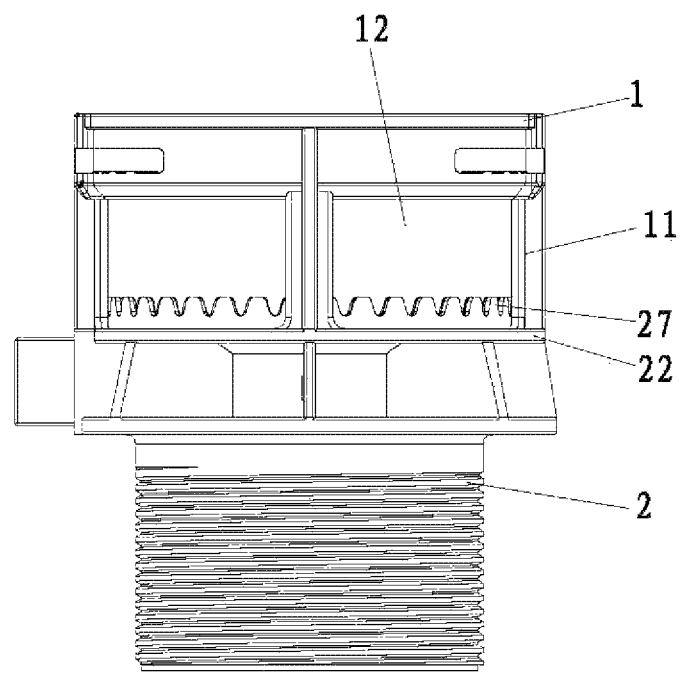
FIG. 10 is a cross-sectional view according to the third embodiment of the present invention.

FIG. 8 to FIG. 10 shows a third embodiment of the present invention, which is substantially similar to the first embodiment with the exceptions described hereinafter. The blocking devices in this embodiment comprise an annular toothed wall (27) disposed on the annular surface (22) at an outer side of the water-sealing convex ring (23). When the water flows to the hollow portions (12), the water passing the toothed wall (27) will generate a first parabola. The distance between the toothed wall (27) and the water-seal convex ring (23) made the height of the water-seal convex ring (23) higher than the height of the first parabola passing the water-seal convex ring (23). This effect can be achieved by adjusting the height of the water-seal convex ring (23) relative to the toothed wall (27). The water passing the toothed wall (27) is direct blocked by the water-seal convex ring (23) to shorten the distance of the parabola. The water passing the water-seal convex ring (23) generates a second parabola, such that the water is filled with the entire drain outlet (21). Therefore, the cross-section area of the water flow increases and the volume of the water increases to accelerate the drain speed.

It is noted that the blocking device comprises the annular stop wall (24) disposed on the annular surface (22) at the outer side of the water-sealing convex ring (23), or the plurality of guiding cylindrical posts (251 or 252) disposed at the outer side or the inner side of the water-seal convex ring (23), or a combination thereof.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A drain valve base, comprising an upper connection seat and a lower connection seat which are integrally formed, the upper connection seat being connected with the lower connection seat by connection arms which are provided at intervals, hollow portions being formed between every two connection arms, the lower connection seat having an annular surface on a top end thereof, a through drain outlet being formed in a center portion of the lower connection seat, one side of the annular surface being formed with a water-seal convex ring located close to the drain outlet, the water-seal convex ring having a water-seal surface on a top end thereof, and blocking devices which can stop water flow being provided on at inner side and an outer side of the water-seal convex ring, wherein the blocking devices comprise an annular stop wall disposed on the annular surface at the outer side of the water-sealing convex ring, the stop wall being integrally connected with the connection arms, a plurality of guiding cylindrical posts being provided between the stop wall and the water-seal convex ring and at an inner side of the water-seal convex ring, the guiding cylindrical posts at the outer side of the water-seal convex ring having a height greater than that of the stop wall, the guiding cylindrical posts at the inner side of the water-seal convex ring having a height less than that of the water-seal convex ring.

2. A drain valve base, comprising an upper connection seat and a lower connection seat which are integrally formed, the upper connection seat being connected with the lower connection seat by connection arms which are provided at intervals, hollow portions being formed between every two connection arms, the lower connection seat having an annular surface on a top end thereof, a through drain outlet being formed in a center portion of the lower connection seat, one side of the annular surface being formed with a water-seal convex ring located close to the drain outlet, the water-seal convex ring having a water-seal surface on a top end thereof, and blocking devices which can stop water flow being provided on at inner side and an outer side of the water-seal convex ring, wherein one of the blocking devices comprise an annular toothed wall disposed on the annular surface at an outer side of the water-sealing convex ring.

* * * * *

UNITED STATES PATENT AND TRADEMARK OFFICE
CERTIFICATE OF CORRECTION

Page 1 of 1

PATENT NO. : 8,899,549 B2
APPLICATION NO. : 13/639010
DATED : December 2, 2014
INVENTOR(S) : Yongmao Liu It is certified that error appears in the above-identified patent and that said Letters Patent is hereby corrected as shown below:

On the title page item "(76)" should read --(75)--

On the title page add item (73),

Assignee: LAB (XIAMEN) SANTITARY FITTING INC.

XIAMEN, FUJIAN (CN)

Signed and Sealed this
Twenty-second Day of December, 2015

Michelle K. Lee
*Director of the United States Patent and Trademark Office*